US012040556B2

(12) United States Patent
Cheng et al.

(10) Patent No.: US 12,040,556 B2
(45) Date of Patent: Jul. 16, 2024

(54) ELECTRONIC DEVICE

(71) Applicant: Getac Technology Corporation, New Taipei (TW)

(72) Inventors: Kuo-Heng Cheng, Taipei (TW); Chia-Chun Kao, Taipei (TW)

(73) Assignee: GETAC TECHNOLOGY CORPORATION, New Taipei (TW)

( * ) Notice: Subject to any disclaimer, the term of this patent is extended or adjusted under 35 U.S.C. 154(b) by 0 days.

(21) Appl. No.: 18/236,448

(22) Filed: Aug. 22, 2023

(65) Prior Publication Data

US 2023/0395975 A1 Dec. 7, 2023

Related U.S. Application Data

(63) Continuation of application No. 17/507,286, filed on Oct. 21, 2021, now Pat. No. 11,769,945.

(30) Foreign Application Priority Data

Oct. 23, 2020 (CN) ......................... 202011146695.6

(51) Int. Cl.

| | |
|---|---|
| ***H01Q 3/36*** | (2006.01) |
| ***H01Q 1/22*** | (2006.01) |
| ***H01Q 1/24*** | (2006.01) |

(52) U.S. Cl.

CPC ................. *H01Q 3/36* (2013.01); *H01Q 1/22* (2013.01); *H01Q 1/2266* (2013.01); *H01Q 1/24* (2013.01)

(58) Field of Classification Search

CPC .......... H01Q 3/36; H01Q 1/2266; H01Q 1/24; H01Q 1/22

See application file for complete search history.

(56) References Cited

U.S. PATENT DOCUMENTS

| | | | | |
|---|---|---|---|---|
| 2010/0073242 A1* | 3/2010 | Ayala Vazquez ...... | H01Q 5/371 | 343/702 |
| 2010/0073243 A1* | 3/2010 | Ayala Vazquez .... | H01Q 1/2266 | 343/702 |
| 2010/0321253 A1* | 12/2010 | Ayala Vazquez ...... | H01Q 13/18 | 343/702 |
| 2010/0321255 A1* | 12/2010 | Kough ................... | H01Q 1/243 | 343/702 |
| 2017/0212554 A1* | 7/2017 | Guterman ............. | G06F 1/1681 | |
| 2018/0342789 A1* | 11/2018 | Jiang ...................... | H01Q 1/528 | |

* cited by examiner

*Primary Examiner* — Hai V Tran

(74) *Attorney, Agent, or Firm* — Locke Lord LLP; Tim Tingkang Xia, Esq.

(57) ABSTRACT

An electronic device provided includes a host device and a display device. The host device includes a base shell and a handle, wherein the base shell has a first accommodating space and a fourth accommodating space. The handle has a second accommodating space and a third accommodating space. The electronic device further includes a first array antenna, a second array antenna, and a third array antenna. The first array antenna, the second array antenna, and the third array antenna are respectively arranged in three of the first accommodating space, the second accommodating space, the third accommodating space, and the fourth accommodating space, wherein the first array antenna, the second array antenna, and the third array antenna respectively have a first beam, a second beam, and a third beam facing a first axis. Accordingly, the electronic device provides stable connection quality and a higher transmission rate.

20 Claims, 7 Drawing Sheets

ELECTRONIC DEVICE

CROSS-REFERENCE TO RELATED PATENT APPLICATION

This non-provisional application is a Continuation application of U.S. patent application Ser. No. 17/507,286, filed on Oct. 21, 2021, now allowed, which itself claims priority to CN Patent Application No. 202011146695.6, filed on Oct. 23, 2020, the disclosure of which is also hereby incorporated by reference herein in its entirety.

BACKGROUND OF THE INVENTION

Field of the Invention

The present invention relates to an electronic device, and more particularly, to an electronic device with a plurality of array antennas arranged in a base shell.

Description of the Prior Art

Along with the thriving development of wireless bandwidth networks and mobile communication technologies, diversified electronic products (for example, cell phones, tablet computers or laptop computers) with a wireless communication function have become popular extensively, such that the number of antenna elements is also increased with the evolving communication technologies. However, as the number of antenna elements continues to increase, the space within an electronic device is not accordingly increased. Moreover, distances between antenna elements or between antenna elements and other electronic elements of the electronic product are contrarily reduced, not only aggravating the issue of coupling between the antenna elements or with other electronic elements, but further degrading the antenna performance and communication quality. As a result, designers are faced with numerous new tough challenges.

SUMMARY OF THE INVENTION

In view of the above, an electronic device provided according to an embodiment of the present invention includes a host device and a display device. The host device includes a base shell and a handle, wherein the base shell has a first side and a second side, the second side is opposite to the first side, the first side has a first accommodating space, and the second side has a fourth accommodating space. The handle is coupled to the base shell, and has a first lateral and a second lateral respectively on two opposite sides thereof, wherein the first lateral has a second accommodating space, and the second lateral has a third accommodating space. The display device is pivotally connected to the host device, and turns relative to the host device. The electronic device further includes a first array antenna, a second array antenna, and a third array antenna. The first array antenna, the second array antenna and the third array antenna are respectively arranged in three of the first accommodating space, the second accommodating space, the third accommodating space and the fourth accommodating space, wherein the first array antenna, the second array antenna and the third array antenna respectively have a first beam, a second beam and a third beam facing a first axis.

In one embodiment of the present invention, the second array antenna and the first array antenna have different placement directions, and the third array antenna and the first array antenna have different placement directions.

In one embodiment of the present invention, the first array antenna is arranged in the first accommodating space, the second array antenna is arranged in the second accommodating space, and the third array antenna is arranged in the third accommodating space.

In one embodiment of the present invention, the electronic device further includes a first radio-frequency (RF) signal processing module, and a second RF signal processing module and a third RF signal processing module. The first RF signal processing module is arranged in the first accommodating space and coupled to the first array antenna, and is for transmitting or receiving a first RF signal via the first array antenna. The second RF signal processing module is arranged in the second accommodating space and coupled to the second array antenna, and is for transmitting or receiving a second RF signal via the second array antenna. The third RF signal processing module is arranged in the third accommodating space and coupled to the third array antenna, and is for transmitting or receiving a third RF signal via the third array antenna.

In one embodiment of the present invention, the host device further includes a substrate arranged in the base shell, and the electronic device further includes a baseband signal processing module arranged on the substrate. The baseband signal processing module is coupled to the first RF signal processing module, the second RF signal processing module and the third RF signal processing module respectively via a first RF signal transmission line, a second RF signal transmission line and a third RF signal transmission line. The baseband signal processing module is for generating a baseband signal, the first RF signal processing module receives and processes the baseband signal to generate the first RF signal, the second RF signal processing module receives and processes the baseband signal to generate the second RF signal, and the third RF signal processing module receives and processes the baseband signal to generate the third RF signal.

In one embodiment of the present invention, the electronic device further includes a phase control module arranged on the substrate. The phase control module is coupled to the first RF signal processing module, the second RF signal processing module and the third RF signal processing module respectively via a first signal control line, a second signal control line and a third signal control line. The phase control module is for generating a first phase control signal, a second phase control signal and a third phase control signal so as to respectively adjust a beam direction of the first beam, a beam direction of the second beam and a beam direction of the third beam.

In one embodiment of the present invention, the electronic device further includes a fourth array antenna arranged in the fourth accommodating space. The fourth antenna has a fourth beam facing the first axis. The fourth array antenna and the second array antenna have different placement directions, and the fourth array antenna and the third array antenna have different placement directions.

In one embodiment of the present invention, the electronic device further includes a fourth RF signal processing module arranged in the fourth accommodating space and coupled to the fourth array antenna. The fourth RF signal processing module is for transmitting or receiving a fourth RF signal.

In one embodiment of the present invention, the baseband signal processing module is further coupled to the fourth RF signal processing module via a fourth RF signal transmission line, wherein the fourth RF signal processing module receives and processes the baseband signal to generate a fourth RF signal.

In one embodiment of the present invention, the phase control module is further coupled to the fourth RF signal processing module via a fourth signal control line, and the phase control module is further for generating a fourth phase control signal so as to adjust a beam direction of the fourth beam.

In the electronic device provided according to the embodiments of the present invention, the plurality of array antennas are arranged in the base shell and the placement position and inclined angle of each array antenna are adjusted, so that each array antenna has a beam substantially facing a specific axis. Moreover, according to one or both of the signal quality and the signal strength received on the specific axis, one or both of the beam directions and inclined angles of the plurality of array antennas are adjusted, so that the plurality of array antennas can accurately point toward a base station and prevent signal interruption from the base station. Accordingly, stable connection quality and a higher transmission rate are provided between the electronic device and the base station.

The description above is only a summary of the technical solutions of the present invention. To more clearly understand the technical means of the present invention so as to enable implementation based on the disclosure of the description of the present application, and to better understand the above and other objects, features and advantages of the present invention, preferred embodiments are described in detail with the accompanying drawings below.

DETAILED DESCRIPTION OF THE EMBODIMENTS

In some wireless communication systems (for example, millimeter wave communication systems), signals may be transmitted or received between a base station and a user device (for example, a laptop computer) by a plurality of antennas. An electronic device provided by an embodiment of the present invention is applicable to an electronic device (for example, a laptop computer) having a wireless communication function.

Figure 1A:
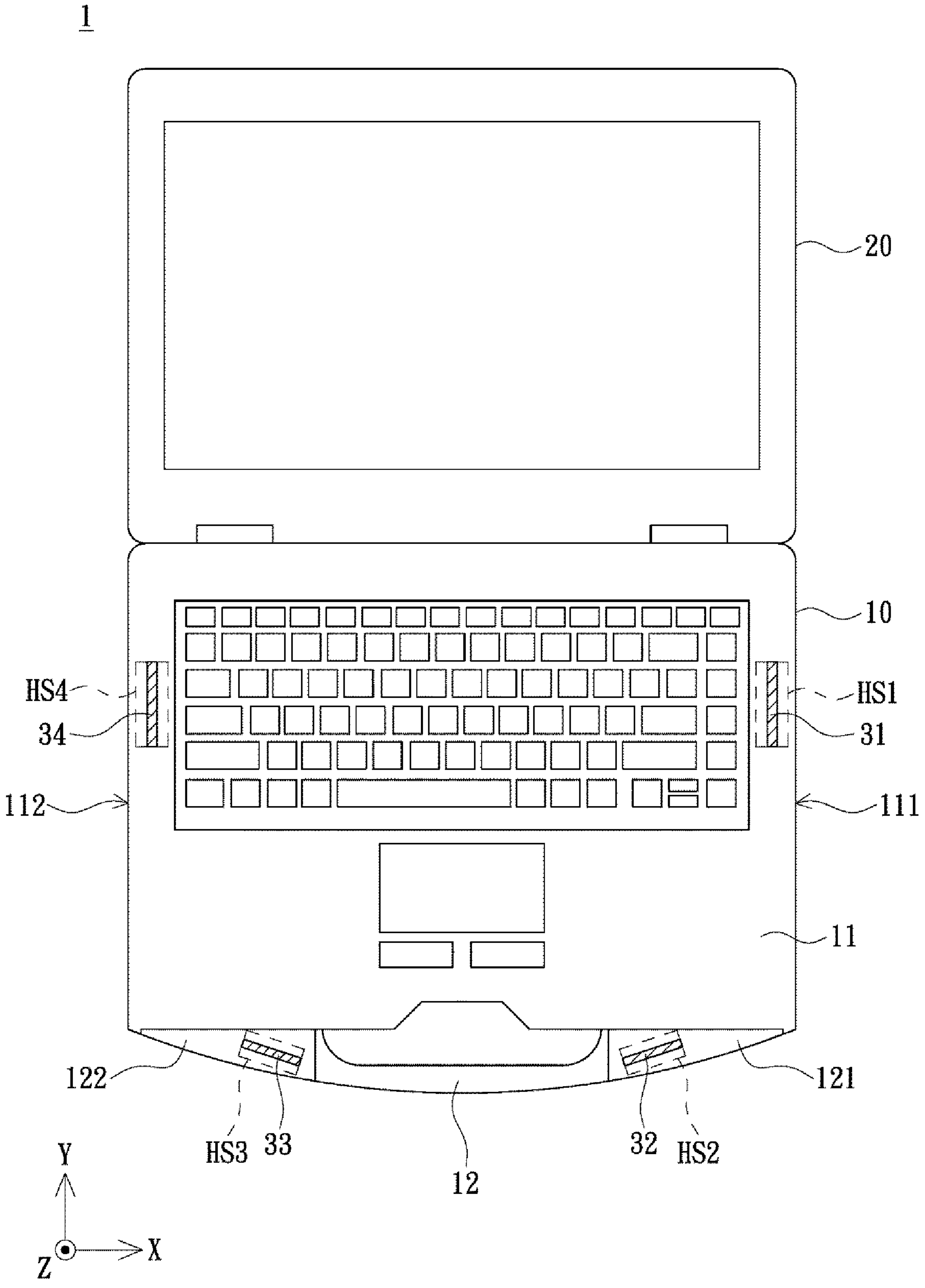
FIG. 1A is a schematic diagram of an electronic device depicted according to an embodiment of the present invention.
Figure 1B:
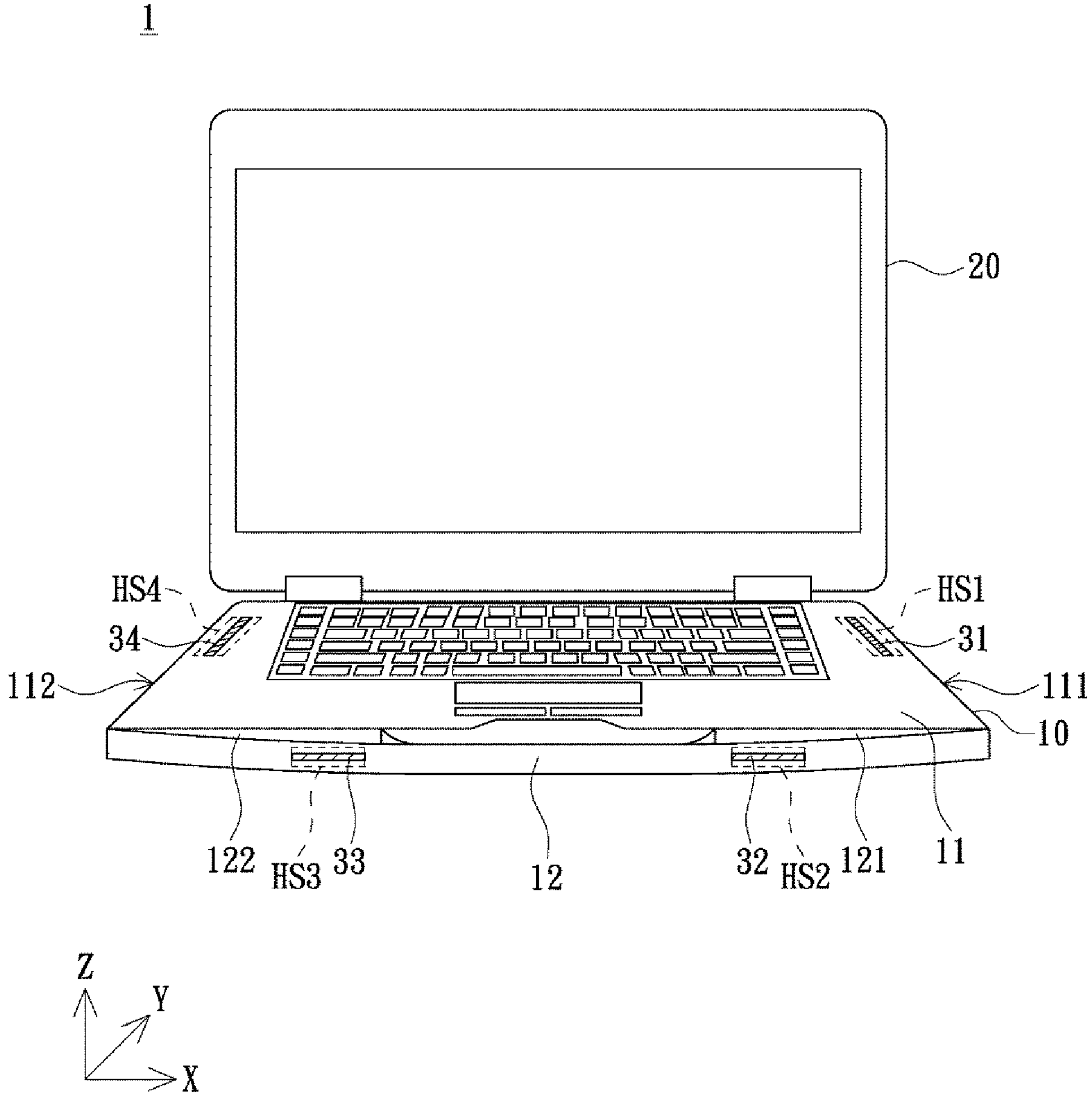
FIG. 1B is another schematic diagram of an electronic device depicted according to an embodiment of the present invention.

Refer to FIG. 1A and FIG. 1B. FIG. 1A shows a schematic diagram of an electronic device depicted according to an embodiment of the present invention, and FIG. 1B shows another schematic diagram of an electronic device depicted according to an embodiment of the present invention. An electronic device 1 provided according to an embodiment of the present invention includes a host device 10 and a display device 20. The host device 10 includes a base shell 11 and a handle 12, wherein the base shell 11 has a first side 111 and a second side 112, the second side 112 is opposite to the first side 111, the first side 111 has a first accommodating space HS1, and the second side 112 has a fourth accommodating space HS4. The handle 12 is coupled to the base shell 11, and has a first lateral 121 and a second lateral 122 respectively on two opposite sides thereof, wherein the first lateral 121 has a second accommodating space HS2, and the second lateral 122 has a third accommodating space HS3. Moreover, the display device 20 is pivotally connected to the host device 10, so that the display device 20 is turnable or rotatable relative to the host device 10 to have the electronic device 1 be in an open or closed state.

The electronic device 1 further includes a first array antenna 31, a second array antenna 32 and a third array antenna 33. The first array antenna 31, the second array antenna 32 and the third array antenna 33 are respectively arranged in three of the first accommodating space HS1, the second accommodating space HS2, the third accommodating space HS3, and the fourth accommodating space HS4. In one embodiment of the present invention, the first array antenna 31 is preferably arranged in the first accommodating space HS1, the second array antenna 32 is preferably arranged in the second accommodating space HS2, and the third array antenna 33 is preferably arranged in the third accommodating space HS3.

The first array antenna 31, the second array antenna 32 and the third array antenna 33 are preferably millimeter wave array antennas, for example, 1×4 millimeter wave array antennas (each including four identically structured and sized antenna elements, for example, patch antennas) and arranged in the accommodating space in the base shell 11, and are for emitting (that is, transmitting) or receiving radio waves. The radio waves generated by the first array antenna 31, the second array antenna 32 and the third array antenna 33 are capable of performing beam scanning in specific directions in a selected axis (for example, the X axis, Y axis or Z axis) by means of phase controls, so as to at all times detect the direction or position of a base station (not shown) near the electronic device 1.

For example, if a scanning angle range is positive/negative 60 degrees, the beams generated by the first array antenna 31, the second array antenna 32 and the third array antenna 33 can cover a communication range of approximately 120 degrees. In order to detect the position of a base station at all times, the electronic device 1 performs scanning preferably according to one or both of the signal quality (for example, a connection speed) and the signal strength (for example, a strength indicator of the received signal), and in real time adjusts the beam directions of the first array antenna 31, the second array antenna 32 and the third array antenna 33, so that the array antennas above can accurately point toward the base station, preventing signal interruption from the base station. Accordingly, stable connection quality and a higher transmission rate are provided between the electronic device 1 and the base station.

Figure 2:
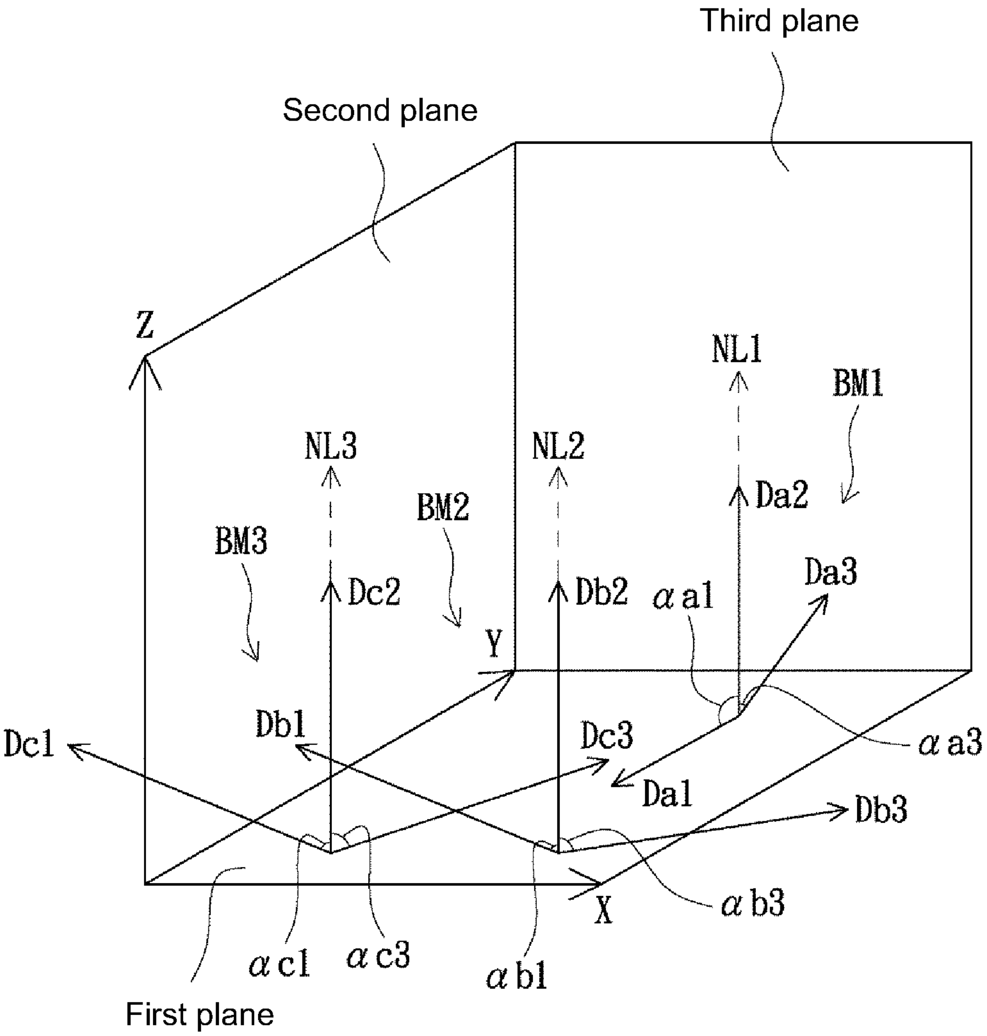
FIG. 2 is a schematic diagram of beams of array antennas depicted according to an embodiment of the present invention.

FIG. 2 shows a schematic diagram of beams of array antennas depicted according to an embodiment of the present invention. Assuming that the host device 10 of the electronic device 1 is located on an XY plane (defined as a first plane) formed by the X axis and the Y axis, the first array antenna 31, the second array antenna 32 and the third array antenna 33 have a first beam BM1, a second beam BM2 and a third beam BM3 respectively facing a first axis (that is, the Z axis). In other words, the first array antenna 31 is located on the first plane, and generates the first beam BM1 of a different angle facing the first axis, and the first beam BM1 is substantially parallel to a YZ plane (defined as a second plane) formed by the Y axis and the Z axis, so that the first array antenna 31 can perform scanning on the first plane. Similarly, the second array antenna 32 and the third array antenna 33 are located on the first plane, and respectively generate the second beam BM2 and the third BM3 of different angles facing the first axis, and the second beam BM2 and the third beam BM3 are substantially parallel to an XZ plane (defined as a third plane) formed by the X axis and the Z axis, so as to perform scanning by the second array antenna 32 and the third array antenna 33 on the first plane and substantially in the direction of the first axis.

Further, a beam direction Da1 of the first beam BM1 and a first normal direction NL1 (defined as being perpendicular to the first plane) have a positive shift angle αa1 (for example, 60 degrees) in between, a beam direction Da2 of the first beam BM1 and the first normal direction NL1 have a shift angle of 0 degree in between, and a beam direction Da3 of the first beam BM1 and the first normal direction NL1 have a positive shift angle αa3 (for example, negative 60 degrees) in between. In other words, when the scanning angle range of the first array antenna 31 is positive/negative 60 degrees, the first array antenna 31 can cover a communication range of 120 degrees.

A beam direction Db1 of the second beam BM2 and a second normal direction NL2 (defined as being perpendicular to the first plane) have a positive shift angle αb1 (for example, 60 degrees) in between, a beam direction Db2 of the second beam BM2 and the second normal direction NL2 have a shift angle of 0 degree in between, and a beam direction Db3 of the second beam BM2 and the second normal direction NL2 have a negative shift angle αb3 (for example, negative 60 degrees) in between. In other words, when the scanning angle range of the second array antenna 32 is positive/negative 60 degrees, the second array antenna 32 can cover a communication range of 120 degrees.

A beam direction Dc1 of the third beam BM3 and a third normal direction NL3 (defined as being perpendicular to the first plane) have a positive shift angle αc1 (for example, 60 degrees) in between, a beam direction Dc2 of the third beam BM3 and the third normal direction NL3 have a shift angle of 0 degree in between, and a beam direction Dc3 of the third beam BM3 and the third normal direction NL3 have a positive shift angle αc3 (for example, negative 60 degrees) in between. In other words, when the scanning angle range of the third array antenna 33 is positive/negative 60 degrees, the third array antenna 33 can cover a communication range of 120 degrees.

Thus, the electronic device 1 can dynamically adjust the beam direction of the first array antenna 31, the beam direction of the second array antenna 32 and the beam direction of the third array antenna 33 according to one or both of the signal quality and the signal strength, so that the first beam BM1, the second beam BM2 and the third beam BM3 are capable of accurately pointing toward a base station and preventing signal interruption. Accordingly, the electronic device provides stable connection quality and a higher transmission rate on the first plane and in a direction substantially facing the first axis.

It should be noted that, the second array antenna 32 and the first array antenna 31 preferably have different placement directions, and the third array antenna 33 and the first array antenna 31 preferably have different placement directions. In one embodiment of the present invention, the placement directions of the first array antenna 31 and the second array antenna 32 are substantially orthogonal, and the placement directions of the first array antenna 31 and the third array antenna 33 are substantially orthogonal. In one embodiment of the present invention, an imaginary line of the placement direction of the first array antenna 31 may be substantially orthogonal to an imaginary line of the placement direction of the second array antenna 32. In one embodiment of the present invention, the imaginary line of the placement direction of the first array antenna 31 may also be substantially orthogonal to an imaginary line of the placement direction of the third array antenna 33. In one embodiment of the present invention, the placement directions of the first array antenna 31, the second array antenna 32 and the third array antenna 33 may also be arranged with included angles of 120 degrees from each other. In one embodiment of the present invention, the first array antenna 31 is preferably arranged on a center line of the first side 111. The second array antenna 32 and the third array antenna 33 are preferably in a symmetrical arrangement by regarding the handle 12 as a center. In another embodiment of the present invention, the second array antenna 32 and the third array antenna 33 are preferably in an asymmetrical arrangement on two sides of the handle 12. In another embodiment of the present invention, the first array antenna 31 is preferably arranged at a position corresponding to the first side 111. In another embodiment of the present invention, each of the second array antenna 32 and the third array antenna 33 has an inclined angle relative to a rotating axis (defined as a pivotal axis of the display device 20 and the host device 10) of the display device 20 and the host device 10. In another embodiment of the present invention, the first array antenna 31 is preferably arranged on the center line the first side 111 closer to the rotating axis.

Moreover, because the beams generated by the first array antenna 31, the second array antenna 32 and the third array antenna 33 may be affected by the materials (for example, circuit boards, electronic elements, metal elements and components) of the electronic device 1, these beams may be absorbed, reflected, or shifted from predetermined radiation angles owing to the materials. In addition, if distances between the antennas are too close, an overlapping range of beam scanning may be increased, hence resulting in a decreased coverage area of the beams. Thus, in another embodiment of the present invention, the inclined angles of the first array antenna 31, the second array antenna 32 and the third array antenna 33 are adjusted, so as to reduce the influences of those materials upon the beams, or to reduce the overlapping range of beam scanning between the beams.

Figure 3A:
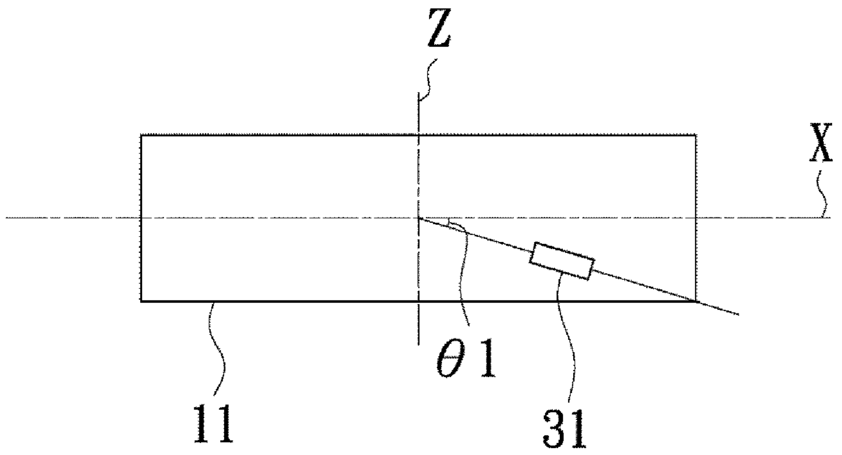
FIG. 3A is a schematic diagram of a first array antenna shifted from a second axis depicted according to another embodiment of the present invention.
Figure 3B:
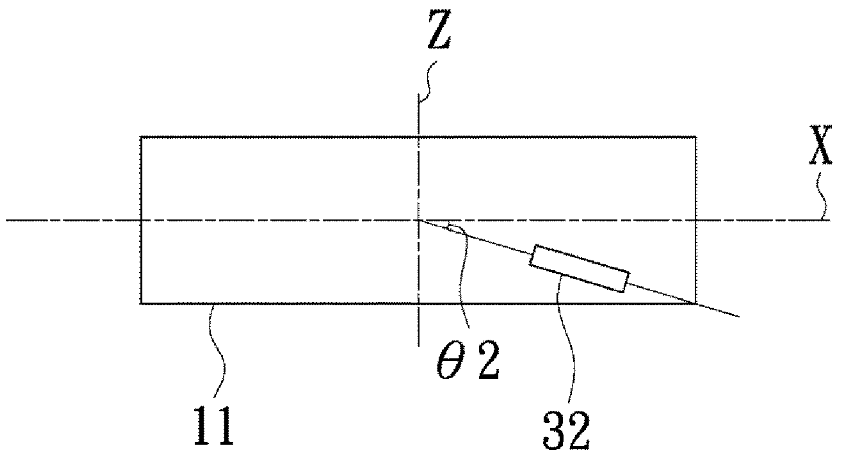
FIG. 3B is a schematic diagram of a second array antenna shifted from a second axis depicted according to another embodiment of the present invention.
Figure 3C:
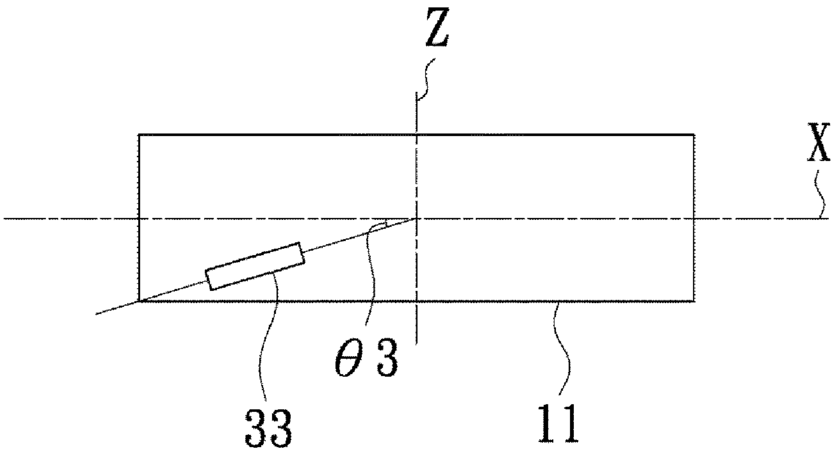
FIG. 3C is a schematic diagram of a third array antenna shifted from a second axis depicted according to another embodiment of the present invention.

Refer to FIG. 3A to FIG. 3C. FIG. 3A shows a schematic diagram of a first array antenna shifted from a second axis depicted according to another embodiment of the present invention. FIG. 3B shows a schematic diagram of a second array antenna shifted from a second axis depicted according to another embodiment of the present invention. FIG. 3C shows a schematic diagram of a third array antenna shifted from a second axis depicted according to another embodiment of the present invention. In another embodiment of the present invention, the first array antenna 31, the second array antenna 32 and the third array antenna 33 are shifted from a second axis (that is, the X axis). When observed from the XZ plane (that is, the plane formed by X axis and the Z axis), the first array antenna 31 inclines by a first angle θ1 relative to the base shell 11 and the second axis, such that the first beam BM1 of the first array antenna 31 passes through the upper and the upper right of the host device 10 to transmit and receive signals in the millimeter wave frequency band, wherein the first angle θ1 is preferably between 30 degrees and 45 degrees. In one embodiment of the present invention, the first angle θ1 is preferably between 15 degrees and 60 degrees. In one embodiment of the present invention, the first angle θ1 is preferably between 0 degree and 90 degrees. In one embodiment of the present invention, the first angle θ1 is adjustable as desired according to the designer's requirements. Since most of the first beam BM1 is eluded from the display device 20, the absorption, reflection or shifting from a predetermined radiation angle caused by the materials (for example, a liquid display panel, electronic elements, metal elements and components) of the display device 20 is significantly reduced.

When observed from the XZ plane, the second array antenna 32 inclines by a second angle θ2 relative to the base shell 11 and the second axis, such that the second beam BM2 of the second array antenna 32 passes through the upper and the upper right of the host device 10 to transmit and receive signals in the millimeter wave frequency band, wherein the second angle θ2 is preferably between 30 degrees and 45 degrees. In one embodiment of the present invention, the second angle θ2 is preferably between 15 degrees and 60 degrees. In one embodiment of the present invention, the second angle θ2 is preferably between 0 degree and 90 degrees. In one embodiment of the present invention, the second angle θ2 is adjustable as desired according to designer's requirements. When observed from the XZ plane, the third array antenna 33 inclines by a third angle θ3 relative to the base shell 11 and the second axis, such that the third beam BM3 of the third array antenna 33 passes through the upper and the upper left of the host device 10 to transmit and receive signals in the millimeter wave frequency band, wherein the third angle θ3 is preferably between 30 degrees and 45 degrees. In one embodiment of the present invention, the third angle θ3 is preferably between 15 degrees and 60 degrees. In one embodiment of the present invention, the third angle θ3 is preferably between 0 degree and 90 degrees. In one embodiment of the present invention, the third angle θ3 is adjustable as desired according to designer's requirements. Since most of the second beam BM2 passes the upper right of the host device 10 and most of the third beam BM3 passes through the upper left of the host device 10, an overlapping range of beam scanning of the second beam BM2 and the third beam BM3 is significantly reduced. Accordingly, the range of beam scanning of the second beam BM2 and the third beam BM3 is increased on the first plane.

In another embodiment of the present invention, the electronic device 1 further includes a first angle control module (not shown), a second angle control module (not shown) and a third angle control module (not shown), which are coupled to a processor (not shown) and respectively coupled to the first array antenna 31, the second array antenna 32 and the third array antenna 33, and are for turning the first array antenna 31, the second array antenna 32 and the third array antenna 33 respectively according to angle control signals outputted by the processor, so as to incline the first array antenna 31, the second array antenna 32 and the third array antenna 33 by a predetermined angle relative to the base shell 11 and the second axis. In this embodiment, the first angle control module, the second angle control module and the third angle control module are preferably step motors. The processor above may output the angle control signals to the angle control modules according to the signal quality and/or the signal strength. Accordingly, the inclined angles of the first array antenna 31, the second array antenna 32 and the third array antenna 33 relative to the base shell 11 and the second axis are adjusted.

Figure 4:
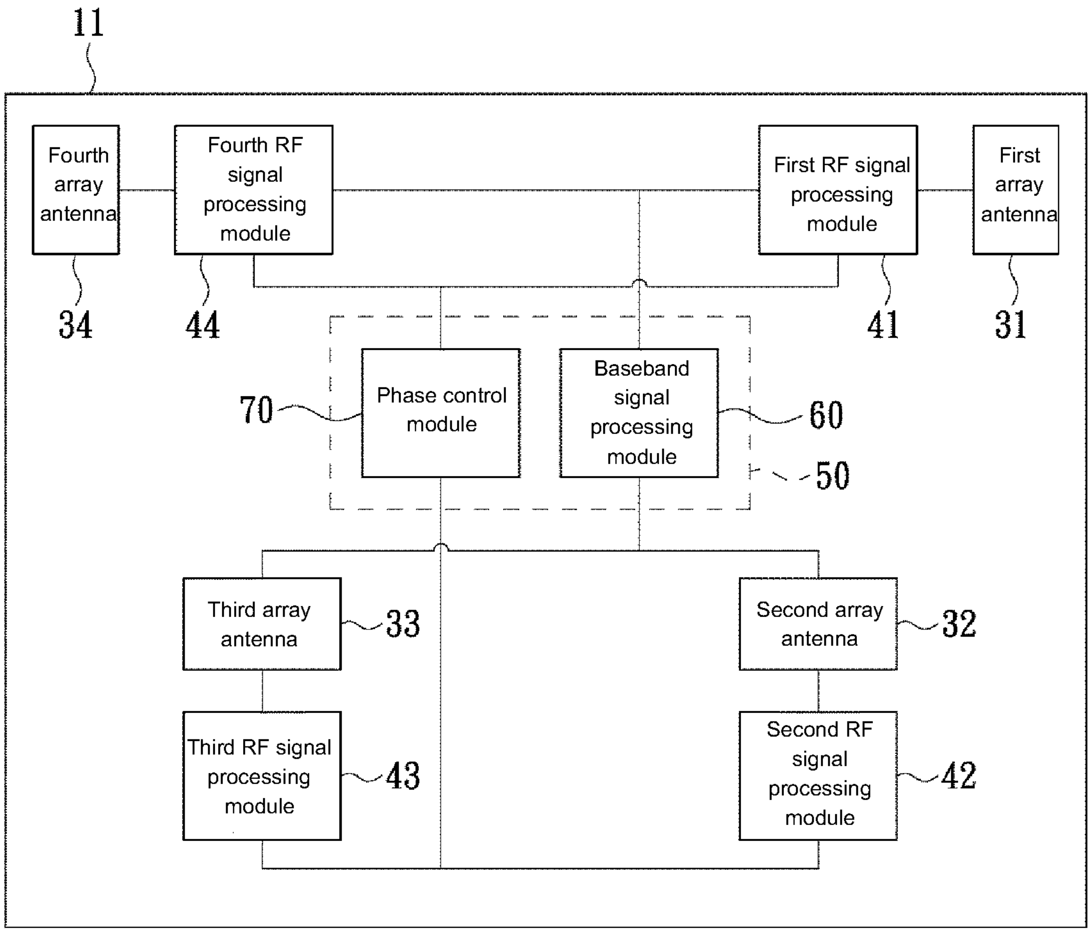
FIG. 4 is a schematic diagram of a simplified configuration of elements of an electronic device depicted according to an embodiment of the present invention.

FIG. 4 shows a schematic diagram of a simplified configuration of elements of an electronic device depicted according to an embodiment of the present invention. The electronic device 1 provided according to an embodiment of the present invention further includes a first radio-frequency (RF) signal processing module 41, a second RF signal processing module 42 and a third RF signal processing module 43. The first RF signal processing module 41 is preferably arranged in the first accommodating space HS1 and coupled to the first array antenna 31, and is for transmitting or receiving a first RF signal via the first array antenna 31. The second RF signal processing module 42 is preferably arranged in the second accommodating space HS2 and coupled to the second array antenna 32, and is for transmitting or receiving a second RF signal via the second array antenna 32. The third RF signal processing module 43 is preferably arranged in the third accommodating space HS3 and coupled to the third array antenna 33, and is for transmitting or receiving a third RF signal via the third array antenna 33. In this embodiment, the RF signal processing modules may include antenna switches, filters, low-noise input amplifiers, power amplifiers, phase shifters and RF transceivers. In another embodiment of the present invention, the first RF signal processing module 41 and the first array antenna 31 may be integrated into one module. The second RF signal processing module 42 and the second array antenna 32 may be integrated into one module. The third RF signal processing module 43 and the third array antenna 33 may be integrated into one module.

Figure 5:
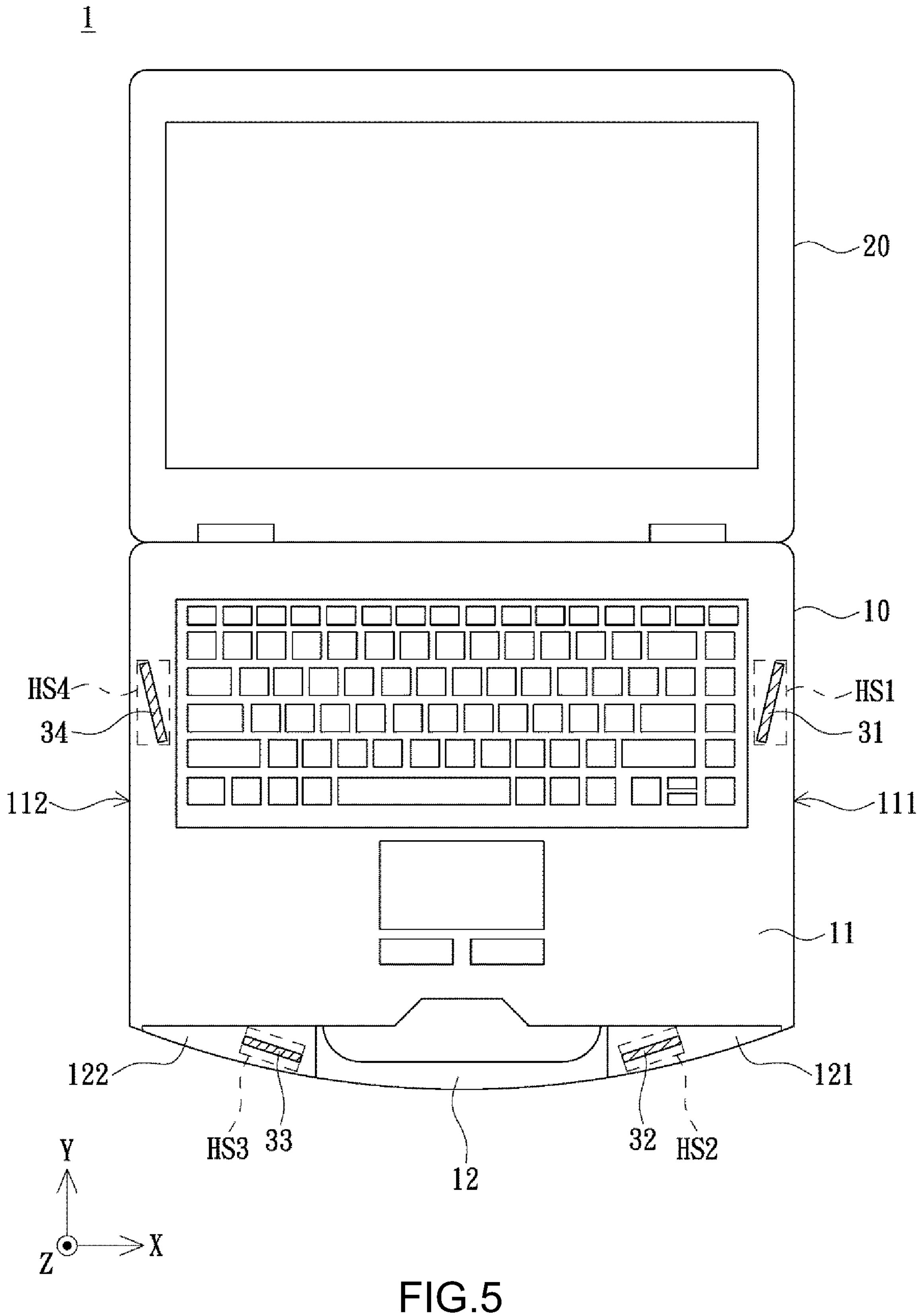
FIG. 5 is a schematic diagram of an electronic device depicted according to another embodiment of the present invention.
Figure 6A:
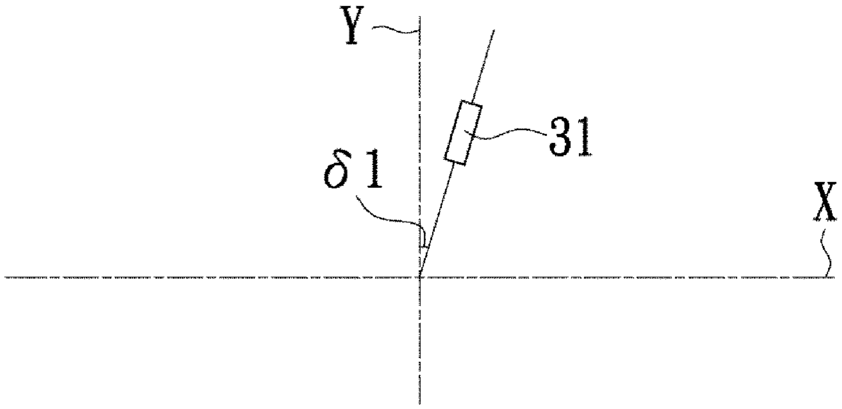
FIG. 6A is a schematic diagram of a first array antenna shifted from a third axis depicted according to another embodiment of the present invention.
Figure 6B:
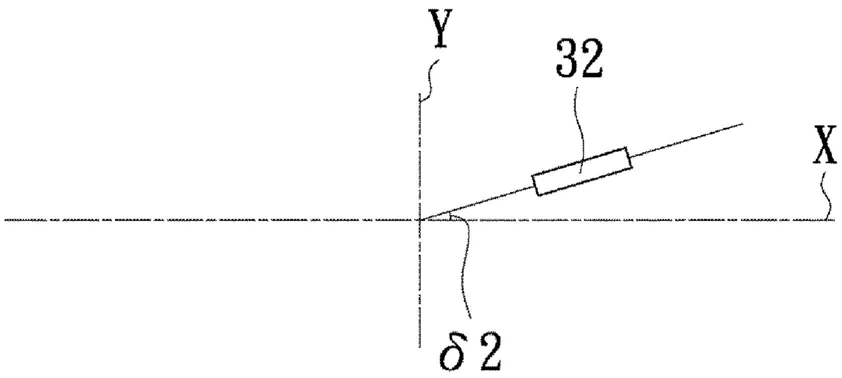
FIG. 6B is a schematic diagram of a second array antenna shifted from a second axis depicted according to another embodiment of the present invention.
Figure 6C:
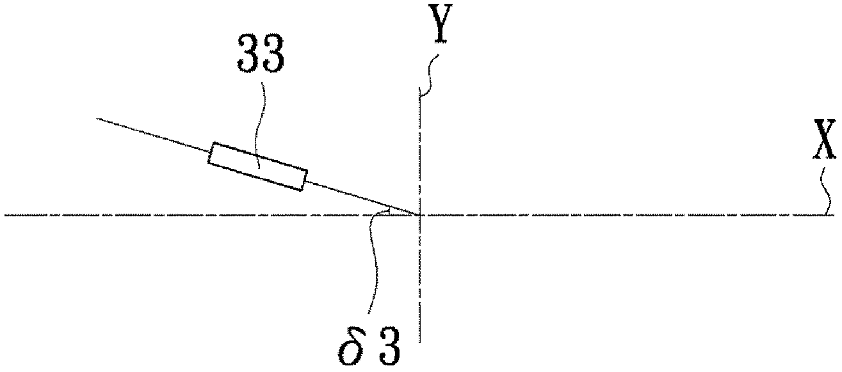
FIG. 6C is a schematic diagram of a third array antenna shifted from a second axis depicted according to another embodiment of the present invention.

FIG. 5 is a schematic diagram of an electronic device depicted according to another embodiment of the present invention. As shown in FIG. 5, the first array antenna 31 is shifted from a third axis (that is, the Y axis). Refer to FIG. 6A to FIG. 6C. FIG. 6A shows a schematic diagram of a first array antenna shifted from a third axis depicted according to another embodiment of the present invention. FIG. 6B shows a schematic diagram of a second array antenna shifted from a second axis depicted according to another embodiment of the present invention. FIG. 6C shows a schematic diagram of a third array antenna shifted from a second axis depicted according to another embodiment of the present invention. In another embodiment of the present invention, the first array antenna 31 is shifted from the third axis, and the second array antenna 32 and the third array antenna 33 are shifted from the second axis. When observed from the XY plane (that is, the plane formed by X axis and the Y axis), the first array antenna 31 is shifted by a first shift angle δ1 relative to the third axis, such that the first beam BM1 of the first array antenna 31 can be avoided from block interference of the display device 20, wherein the first shift angle δ1 is preferably between 0 degree and 90 degrees. In one embodiment of the present invention, the first shift angle δ1 is preferably between 15 degrees and 75 degrees. In one embodiment of the present invention, the first shift angle δ1 is preferably between 30 degrees and 60 degrees. In one embodiment of the present invention, the first shift angle δ1 is preferably 45 degrees. In one embodiment of the present invention, the first shift angle δ1 is adjustable as desired according to designer's requirements. In one embodiment of the present invention, the first shift angle δ1 is an angle shifted from the third axis to the second axis (that is, the X axis). Thus, since most of the first beam BM1 is eluded from the display device 20, the absorption, reflection or shifting from a predetermined radiation angle caused by the materials (for example, a liquid display panel, electronic elements, metal elements and components) of the display device 20 is significantly reduced.

When observed from the XY plane, the second array antenna 32 is shifted by a second shift angle δ2 relative to the second axis, wherein the second shift angle δ2 is preferably between 0 degree and 90 degrees. In one embodiment of the present invention, the second shift angle δ2 is preferably between 15 degrees and 75 degrees. In one embodiment of the present invention, the second shift angle δ2 is preferably between 30 degrees and 60 degrees. In one embodiment of the present invention, the second shift angle δ2 is preferably 45 degrees. In one embodiment of the present invention, the second shift angle δ2 is adjustable as desired according to designer's requirements. When observed from the XY plane, the third array antenna 33 is shifted by a third shift angle δ3 relative to the second axis, wherein the third shift angle δ3 is preferably between 0 degree and 90 degrees. In one embodiment of the present invention, the third shift angle δ3 is preferably between 15 degrees and 75 degrees. In one embodiment of the present invention, the third shift angle δ3 is preferably between 30 degrees and 60 degrees. In one embodiment of the present invention, the third shift angle δ3 is preferably 45 degrees. In one embodiment of the present invention, the third shift angle δ3 and the second shift angle δ2 may have the same values, and are shifted in opposite directions. In one embodiment of the present invention, the third shift angle δ3 is adjustable as desired according to designer's requirements.

The host device 10 provided according to an embodiment of the present invention further includes a substrate 50 (for example, a printed circuit board) arranged in the base shell 11. The electronic device 1 further includes a baseband signal processing module 60 which is for generating a baseband signal (that is, a digital signal) and is arranged on the substrate 50. The baseband signal processing module 60 is preferably coupled to the first RF signal processing module 41, the second RF signal processing module 42 and the third RF signal processing module 43 respectively via a first RF signal transmission line, a second RF signal transmission line and a third RF signal transmission line. More specifically, the first RF signal processing module 41 is for receiving and processing the baseband signal to generate a first RF signal, the second RF signal processing module 42 is for receiving and processing the baseband signal to generate a second RF signal, and the third RF signal processing module 43 is for receiving and processing the baseband signal to generate a third RF signal.

The electronic device 1 provided according to an embodiment of the present invention further includes a phase control module 70 arranged on the substrate 50. The phase control module 70 is preferably coupled to the first RF signal processing module 41, the second RF signal processing module 42 and the third RF signal processing module 43 respectively via a first signal control line, a second signal control line and a third signal control line. The phase control module 70 is for generating a first phase control signal, a second phase control signal and a third phase control signal, so as to respectively adjust the beam direction of the first beam BM1, the beam direction of the second beam BM2 and the beam direction of the third beam BM3. More specifically, the phase control module 70 may transmit a control signal to the first RF signal processing module 41 via the first signal control line, so as to control a phase shift amount of a phase shifter of the first RF signal processing module 41 and change the phase of a feed signal of the first array antenna 31, further adjusting the beam direction of the first beam BM1 and thereby achieving the function of scanning back-and-forth in the first axis by a predetermined scanning angle ψ (for example, positive/negative 60 degrees). As a result, the first beam BM1 is enabled to cover a range of 120 degrees. Similarly, the phase control module 70 may use the control method above to adjust the beam directions of the second beam BM2 and the third beam BM3, and thus associated details are omitted herein.

The electronic device 1 provided according to an embodiment of the present invention further includes a fourth array antenna 34 which is preferably arranged in the fourth accommodating space HS4. The fourth array antenna 34 has a fourth beam BM4 substantially facing the first axis, wherein the fourth array antenna 34 and the second array antenna 32 preferably have different placement directions, and the fourth array antenna 34 and the third array antenna 33 preferably have different placement directions. In one embodiment of the present invention, the placement directions of the fourth array antenna 34 and the second array antenna 32 are substantially orthogonal, and the placement directions of the fourth array antenna 34 and the third array antenna 33 are substantially orthogonal. In one embodiment of the present invention, an imaginary line of the placement direction of the fourth array antenna 34 may be substantially orthogonal to the imaginary line of the placement direction of the second array antenna 32. In one embodiment of the present invention, the imaginary line of the placement direction of the fourth array antenna 34 may also be substantially orthogonal to the imaginary line of the placement direction of the third array antenna 33. In one embodiment of the present invention, the placement directions of the fourth array antenna 34, the second array antenna 32 and the third array antenna 33 may also be arranged with included angles of 120 degrees from each other. In one embodiment of the present invention, the first array antenna 31, the second array antenna 32, the third array antenna 33 and the fourth array antenna 34 form four vertices of a quadrilateral, and the placement directions thereof are arranged in such a way that two other antennas adjacent to one of the antennas are respectively arranged at included angles of 90 degrees, and the other antenna opposite to the one of the antennas is arranged in parallel. In one embodiment of the present invention, the first array antenna 31, the second array antenna 32, the third array antenna 33 and the fourth array antenna 34 form four vertices of a quadrilateral, and the placement directions are arranged in such a way that one of the antennas adjacent to one of the antennas is at an included angle of 90 degrees and parallel to the other antenna adjacent to the one of the antennas, and the other antenna opposite to the one of the antennas is arranged at an included angle of 90 degrees. In one embodiment of the present invention, the fourth array antenna 34 is preferably arranged on a center line of the second side 112. The second array antenna 32 and the third array antenna 33 are preferably in a symmetrical arrangement by regarding the handle 12 as a center. In another embodiment of the present invention, the second array antenna 32 and the third array antenna 33 are preferably in an asymmetrical arrangement on two sides of the handle 12. In another embodiment of the present invention, the fourth array antenna 34 is preferably arranged at a position corresponding to the second side 112. In another embodiment of the present invention, the fourth array antenna 34 is preferably arranged on the center line the second side 112 closer to the rotating axis. In another embodiment of the present invention, the first array antenna 31 and the fourth array antenna 34 are preferably in a symmetrical arrangement by regarding the center line of the host device 10 as a center. In another embodiment of the present invention, the first array antenna 31 and the fourth array antenna 34 are preferably in an asymmetrical arrangement by regarding the center line of the host device 10 as a center.

The electronic device 1 provided according to one embodiment of the present invention further includes a fourth RF signal processing module 44 which is preferably arranged in the fourth accommodating space HS4 and coupled to the fourth array antenna 34, and is for transmitting or receiving a fourth RF signal via the fourth array antenna 34. Moreover, the baseband signal processing module 60 is further coupled to the fourth RF signal processing module 44 via a fourth RF signal transmission line, wherein the fourth RF signal processing module 44 receives and processes the baseband signal to generate a fourth RF signal. Moreover, the phase control module 70 is further coupled to the fourth RF signal processing module 44 via a fourth signal control line, and the phase control module 70 is further for generating a fourth phase control signal so as to adjust the beam direction of the fourth beam BM4. In this embodiment, the fourth RF signal processing module 44 may include an antenna switch, a filter, a low-noise input amplifier, a power amplifier, a phase shifter and an RF transceiver. In another embodiment of the present invention, the fourth RF signal processing module 44 and the fourth array antenna 34 may be integrated into one module.

In one embodiment of the present invention, the electronic device 1 further includes a fourth angle control module (not shown) which is coupled to the processor (not shown) and the fourth array antenna 34, and is for turning the fourth array antenna 34 according to an angle control signal outputted by the processor, so as to incline the fourth array antenna 34 by a predetermined angle relative to the base shell 11 and the second axis. In this embodiment, the fourth angle control module is preferably a step motor. The processor above may output an angle control signal to the fourth angle control module according to the signal quality and/or the signal strength. Accordingly, the inclined angles of the fourth array antenna 34 relative to the base shell 11 and the second axis are adjusted.

In conclusion, in the electronic device provided according to the embodiments of the present invention, the plurality of array antennas are arranged in the base shell and the placement position and inclined angle of each array antenna are adjusted, so that each array antenna has a beam substantially facing a specific axis. Moreover, according to one or both of the signal quality and the signal strength received on the specific axis, one or both of the beam directions and inclined angles of the plurality of array antennas are adjusted, so that the plurality of array antennas can accurately point toward a base station and prevent signal interruption from the base station. Accordingly, stable connection quality and a higher transmission rate are provided between the electronic device and the base station.

The present invention is disclosed by means of the embodiments above. However, these embodiments are not to be construed as limitations to the present invention. Slight modifications and variations may be made by a person skilled in the art without departing from the spirit and scope of the present invention. Therefore, the scope of protection of the present invention shall be defined by the appended claims.

What is claimed is:

1. An electronic device, comprising:

a host device, comprising a base shell and a handle, wherein the base shell has a first side and a second side, the second side is opposite to the first side, the first side has a first accommodating space, the second side has a fourth accommodating space, the handle is coupled to the base shell, the handle is provided with a first lateral and a second lateral on two opposite sides thereof, the first lateral has a second accommodating space, and the second lateral has a third accommodating space;

a display device, pivotally connected to the host device, the display device turning relative to the host device;

a first array antenna, a second array antenna and a third array antenna, wherein the first array antenna is arranged in the first accommodating space, the second array antenna is arranged in the second accommodating space, and the third array antenna is arranged in the third accommodating space, wherein the first array antenna, the second array antenna and the third array antenna respectively have a first beam, a second beam and a third beam facing a first axis;

wherein on a plane formed by the first axis and a second axis substantially perpendicular to the first axis, the first array antenna is shifted by a first angle relative to the base shell and the second axis, the second array antenna is shifted by a second angle relative to the base shell and the second axis, the third array antenna is shifted by a third angle relative to the base shell and the second axis, and each of the first angle, the second angle and the third angle is between 0 degrees and 90 degrees.

2. The electronic device according to claim 1, wherein each of the first angle, the second angle and the third angle is between 15 degrees and 60 degrees.

3. The electronic device according to claim 1, wherein each of the first angle, the second angle and the third angle is between 30 degrees and 45 degrees.

4. The electronic device according to claim 1, wherein the second array antenna and the first array antenna have different placement directions, and the third array antenna and the first array antenna have different placement directions.

5. The electronic device according to claim 4, further comprising:

a fourth array antenna arranged in the fourth accommodating space, the fourth array antenna having a fourth beam facing the first axis, wherein the fourth array antenna and the second array antenna have different placement directions, and the fourth array antenna and the third array antenna have different placement directions; and a fourth RF signal processing module arranged in the fourth accommodating space and coupled to the fourth array antenna, the fourth RF signal processing module being for transmitting or receiving a fourth RF signal via the fourth array antenna.

6. The electronic device according to claim 1, further comprising:

a first radio-frequency (RF) signal processing module, arranged in the first accommodating space and coupled to the first array antenna, and used for transmitting or receiving a first RF signal via the first array antenna;

a second RF signal processing module, arranged in the second accommodating space and coupled to the second array antenna, and used for transmitting or receiving a second RF signal via the second array antenna; and a third RF signal processing module, arranged in the third accommodating space and coupled to the third array antenna, and used for transmitting or receiving a third RF signal via the third array antenna.

7. The electronic device according to claim 6, wherein the host device further comprises a substrate arranged in the base shell, the electronic device further comprises a baseband signal processing module arranged on the substrate, and the baseband signal processing module is coupled to the first RF signal processing module, the second RF signal processing module and the third signal processing module respectively via a first RF signal transmission line, a second RF signal transmission line and a third RF signal transmission line, wherein the baseband signal processing module is for generating a baseband signal, the first RF signal processing module receives and processes the baseband signal to generate the first RF signal, the second RF signal processing module receives and processes the baseband signal to generate the second RF signal, and the third RF signal processing module receives and processes the baseband signal to generate the third RF signal.

8. The electronic device according to claim 6, further comprising a phase control module arranged on the substrate, the phase control module being coupled to the first RF signal processing module, the second RF signal processing module and the third RF signal processing module respectively via a first signal control line, a second signal control line and a third signal control line, wherein the phase control module is for generating a first phase control signal, a second phase control signal and a third phase control signal so as to respectively adjust a beam direction of the first beam, a beam direction of the second beam and a beam direction of the third beam.

9. The electronic device according to claim 6, further comprising a fourth array antenna arranged in the fourth accommodating space, the fourth array antenna having a fourth beam facing the first axis, wherein the fourth array antenna and the second array antenna have different placement directions, and the fourth array antenna and the third array antenna have different placement directions.

10. The electronic device according to claim 9, further comprising a fourth RF signal processing module arranged in the fourth accommodating space and coupled to the fourth array antenna, the fourth RF signal processing module being for transmitting or receiving a fourth RF signal via the fourth array antenna.

11. The electronic device according to claim 10, wherein the baseband signal processing module is further coupled to the fourth RF signal processing module via a fourth RF signal transmission line, wherein the fourth RF signal processing module receives and processes the baseband signal to generate the fourth RF signal.

12. The electronic device according to claim 10, wherein the phase control module is further coupled to the fourth RF signal processing module via a fourth signal control line, and the phase control module is further for generating a fourth phase control signal so as to adjust a beam direction of the fourth beam.

13. An electronic device, comprising:

a host device, comprising a base shell and a handle, wherein the base shell has a first side and a second side, the second side is opposite to the first side, the first side has a first accommodating space, the second side has a fourth accommodating space, the handle is coupled to the base shell, the handle is provided with a first lateral and a second lateral on two opposite sides thereof, the first lateral has a second accommodating space, and the second lateral has a third accommodating space;

a display device, pivotally connected to the host device, the display device turning relative to the host device;

a first array antenna, a second array antenna and a third array antenna, wherein the first array antenna is arranged in the first accommodating space, the second array antenna is arranged in the second accommodating space, and the third array antenna is arranged in the third accommodating space, wherein the first array antenna, the second array antenna and the third array antenna respectively have a first beam, a second beam and a third beam facing a first axis;

wherein on a plane formed by a second axis and a third axis substantially perpendicular to the first axis, the first array antenna is shifted by a first angle relative to the third axis, the second array antenna is shifted by a second angle relative to the second axis, the third array antenna is shifted by a third angle relative to the second axis, and each of the first angle, the second angle and the third angle is between 0 degrees and 90 degrees.

14. The electronic device according to claim 13, wherein the second angle and the third angle have the same value, and the second array antenna and the third array antenna are shifted in opposite directions.

15. The electronic device according to claim 13, wherein each of the first angle, the second angle and the third angle is between 15 degrees and 75 degrees.

16. The electronic device according to claim 13, wherein each of the first angle, the second angle and the third angle is between 30 degrees and 60 degrees.

17. The electronic device according to claim 13, wherein each of the first angle, the second angle and the third angle is 45 degrees.

18. The electronic device according to claim 13, wherein the second array antenna and the first array antenna have different placement directions, and the third array antenna and the first array antenna have different placement directions.

19. The electronic device according to claim 13, further comprising:

a first radio-frequency (RF) signal processing module, arranged in the first accommodating space and coupled to the first array antenna, and used for transmitting or receiving a first RF signal via the first array antenna;

a second RF signal processing module, arranged in the second accommodating space and coupled to the second array antenna, and used for transmitting or receiving a second RF signal via the second array antenna; and a third RF signal processing module, arranged in the third accommodating space and coupled to the third array antenna, and used for transmitting or receiving a third RF signal via the third array antenna.

20. The electronic device according to claim 19, wherein the host device further comprises a substrate arranged in the base shell, the electronic device further comprises a baseband signal processing module arranged on the substrate, and the baseband signal processing module is coupled to the first RF signal processing module, the second RF signal processing module and the third signal processing module respectively via a first RF signal transmission line, a second RF signal transmission line and a third RF signal transmission line, wherein the baseband signal processing module is for generating a baseband signal, the first RF signal processing module receives and processes the baseband signal to generate the first RF signal, the second RF signal processing module receives and processes the baseband signal to generate the second RF signal, and the third RF signal processing module receives and processes the baseband signal to generate the third RF signal.

* * * * *